United States Patent [19]

Iwamoto et al.

[11] Patent Number: 4,646,059

[45] Date of Patent: Feb. 24, 1987

[54] SOLID-STATE INFORMATION DISPLAY APPARATUS FOR AUTOMOBILE VEHICLE

[75] Inventors: Tadashi Iwamoto; Shizuo Sumida, both of Hiroshima, Japan

[73] Assignee: Mazda Motor Corporation, Hiroshima, Japan

[21] Appl. No.: 673,221

[22] Filed: Nov. 20, 1984

Related U.S. Application Data

[63] Continuation of Ser. No. 351,360, Feb. 23, 1982, abandoned.

[30] Foreign Application Priority Data

Feb. 26, 1981 [JP] Japan .................................. 56-27698

[51] Int. Cl.⁴ ................................................ B60Q 1/00

[52] U.S. Cl. ................................ 340/52 F; 340/52 R

[58] Field of Search ..................... 340/52 F, 52 R, 59, 340/60, 525, 870.09, 870.16

[56] References Cited

U.S. PATENT DOCUMENTS

| | | | |
|---|---|---|---|
| 2,935,729 | 5/1960 | Henss | 340/52 R |
| 3,938,117 | 2/1976 | Bozoian | 340/59 |
| 4,072,924 | 2/1978 | Pomerantz | 340/52 F |
| 4,293,843 | 10/1981 | Bertoloni et al. | 340/52 F |
| 4,409,832 | 10/1983 | Konjedic et al. | 340/59 |

*Primary Examiner*—John W. Caldwell, Sr.
*Assistant Examiner*—Tyrone Queen
*Attorney, Agent, or Firm*—Wenderoth, Lind & Ponack

[57] ABSTRACT

A solid-state display apparatus for visually indicating the status of vehicle speed, engine speed, fuel remaining, coolant temperature and other parameters which altogether represent the condition of the vehicle includes solid-state display gauges constituted by either electroluminescent elements or liquid crystal display cells. Some of the parameters are constantly displayed through their own display gauges at all times during the use of the vehicle while other parameters are adapted to be displayed upon demand through their own display gauges. The other parameters can also be automatically and forcibly displayed in the event of the occurrence of an out-of-limits value thereof.

3 Claims, 3 Drawing Figures

SOLID-STATE INFORMATION DISPLAY APPARATUS FOR AUTOMOBILE VEHICLE

This application is a continuation of now abandoned application Ser. No. 351,360 filed Feb. 23, 1982.

BACKGROUND OF THE INVENTION

The present invention relates to a solid-state information display apparatus for an automotive vehicle for indicating to the vehicle operator the status of parameters which altogether represent the condition of the vehicle being then monitored.

Automobile vehicles are presently provided with a solid-state information display apparatus for indicating to the vehicle operator the status of the some or all of engine oil pressure, coolant temperature, engine speed, vehicle speed, travelling distance, mileage per gallon of fuel and other parameters of a similar nature. In general, the conventional display apparatus comprises an instrument panel positioned in front of a driver's seat inside the body of the vehicle and includes solid-state gauges displaying those parameters which altogether represent the condition of the vehicle being then monitored. Those solid-state gauges are each constituted by one or more arrays of either electro-luminescent elements, such as light emitting diodes, incandescent descent lamps or fluorescent luminescence tubes or liquid crystal display cells in combination with one or more illuminating lamps, which arrays are arranged in a predetermined pattern including one or both of numerical representations and graphic representations.

Since the conventional display apparatus is generally so designed that all of those solid-state gauges are enabled at least when and after the automobile engine has been operated, the vehicle operator tends to be dazzled by excessive light emitted from those gauges, with his or her eyes getting readily tired. In addition to this inconvenience, the fact that all of the solid-state gauges are enabled requires a relatively large amount of electrical power to be consumed while the electrical power available in the vehicle is limited.

Considering a general notion that all of the parameters need not be always displayed at all times except for the vehicle speed which is required to be displayed at all times during the use of the vehicle, i.e., the operation of the engine and/or the running of the vehicle, in view of local traffic regulations, it may be contemplated to divide the parameters to be displayed into two group, one group being displayed at all times during the use of the vehicle and the other group being displayable manually upon demand, i.e., at the vehicle operator's will, and automatically in case of an emergency, i.e., when an out-of-limits condition occurs. This contemplation has been embodied in, for example, U.S. Pat. Nos. 3,866,166 and 4,031,363.

According to these U.S. patents, the system is such that, while the first mentioned group of the parameter or parameters are displayed through its or their own solid-state displays, the second mentioned group of the parameter or parameters are displayed through a single solid-state display on a selective basis. With the system of any one of these U.S. patents, not only can some or all of the parameters of the second-mentioned group not be displayed simultaneously when the vehicle operator so desires, but also an inconvenience will arise when an out-of-limits condition occurs in connection with two or more parameters of the second mentioned group.

SUMMARY OF THE INVENTION

Accordingly, the present invention has been developed with a view to substantially eliminating those disadvantages and inconveniences inherent in the prior art solid-state information display apparatuses and has for its essential object to provide an improved solid-state information display apparatus for an automobile vehicle wherein some of the engine and vehicle operating parameters, which need not be always displayed at all times during the use of the vehicle, are adapted to be displayed through their own solid-state display gauges at the vehicle operator's will and automatically upon occurrence of an out-of-limits condition thereof.

Another important object of the present invention is to provide an improved solid-state information display apparatus of the type referred to above which does not require as much electrical power as that required by the prior art apparatuses of a similar kind.

A further object of the present invention is to provide an improved solid-state information display apparatus of the type referred to above which is simple in its circuit arrangement and can be readily adaptable to the existing instrument panel of the type wherein all of the solid-state display gauges are adapted to be enabled at a time.

A still further object of the present invention is to provide an improved solid-state information display apparatus of the type referred to above which can be manufactured without incurring any increase in manufacturing cost.

BRIEF DESCRIPTION OF THE DRAWINGS

These and other objects and features of the present invention will become apparent from the following detailed description of the present invention taken in conjunction with a preferred embodiment thereof with reference to the accompanying drawings, in which.

DETAILED DESCRIPTION OF THE INVENTION

Figure 1:
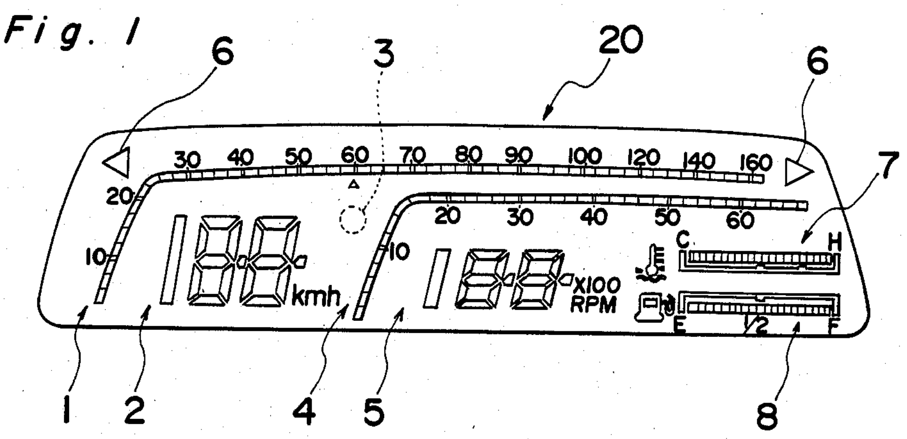
FIG. 1 is a schematic front elevational view of an automobile instrument panel showing the layout of solid-state display gauges.

Before the description of the present invention proceeds, it is to be noted that like parts are designated by like reference numerals throughout the accompanying drawings.

Referring first to FIG. 1, there is shown an automobile instrument panel 20 which is generally positioned in front of a vehicle operator's seat inside the body of the vehicle as is well known to those skilled in the art. The instrument panel 20 so far shown has a plurality of solid-state display gauges, each of which is constituted by a plurality of electroluminescent elements, for example, light emitting diodes and fluorescent luminescence tubes, arranged in a predetermined respective pattern. These solid-state display gauges include:

(a) a vehicle speed gauge 1 with light emitting diodes arranged in a row for indicating the running speed of the vehicle in the form of a bar graph, (b) a vehicle speed gauge 2 with fluorescent luminescence tubes arranged in three separate seven-segment digits for indicating the running speed of the vehicle in the form of a numeric representation, (c) an engine speed gauge 4 with light emitting diodes arranged in a row for indicating the engine speed in the form of a bar graph, (d) an engine speed gauge 5 with fluorescent luminescence tubes arranged in three separate seven-segment digits for indicating the engine speed in the form of a numeric representation, (e) a temperature gauge 7 with light emitting diodes arranged in a row for indicating the temperature of a coolant, for example, water, used to cool the engine in the form of a bar graph, and (f) a fuel gauge 8 with light emitting diodes arranged in a row for indicating the amount of fuel remaining in a fuel tank of the vehicle.

The instrument panel 20 may also have a pair of spaced signaling lamps 6 operable one at a time to show that a respective flasher or direction indicator is in operation, and an indicator 3 operable to show whether the headlights are in their high-beam position or in their low-beam position.

The solid-state information display apparatus in accordance with the present invention comprises a speed sensor 11 of any known construction for detecting, and generating an electrical output indicative of, the running speed of the automobile vehicle when the vehicle engine is operated; an engine sensor 12 of any known construction for detecting, and generating an electrical output indicative of, the rotational speed of the engine being operated; a fuel sensor 13 of any known construction for detecting, and generating an electrical output indicative of, the amount of fuel remaining in the vehicle fuel tank; and a temperature sensor 14 of any known construction for detecting, and generating an electrical output indicative of, the temperature of a coolant or water used to cool the engine. These sensors 11 to 14, if provided in the automobile vehicle for any other purpose known to those skilled in the art other than the purpose for which the present invention is provided, do not have to be separately used only for the purpose of the present invention, but may be the ones now in use in the automobile vehicle. By way of example, a known engine sensor for providing an output signal necessary to control the ignition timing may be used concurrently as the engine sensor 12..

For the purpose of the description of the present invention, the engine and vehicle operating parameters to be displayed by means of the associated solid-state display gauges on the instrument panel 20 are classified into first and second groups depending on whether or not they must be displayed at all times during the use of the vehicle. So far illustrated, the first group includes the running speed of the vehicle whereas the second group includes the engine speed, the fuel remaining and the water temperature.

In view of the above, the speed sensor 11 is electrically connected through an analog-to-digital converter 15 to a pair of parallel-connected decoders **19*a* and 19*b* which are in turn electrically connected to respective input terminals of drive circuits 21*a* and 21*b* for driving the solid-state display gauges 1 and 2. The drive circuits 21*a* and 21*b* are always held in an enabled condition by the supply of an electrical power +Vcc from a power source, shown in the form of an input terminal 22, to other respective input terminals thereof during the use of the vehicle and, therefore, they are ready at all times to drive the display gauges 1 and 2 upon the receipt of respective output signals from the corresponding decoders 19*a* and 19*b***.

Similarly, the engine sensor 12 is electrically connected through an analog-to-digital converter 16 to a pair of parallel-connected decoders **33*a* and 33*b* which are in turn electrically connected to respective input terminals of drive circuits 23*a* and 23*b* for driving the solid-state display gauges 4 and 5. Unlike those of the drive circuits 21*a* and 21*b*, other respective input terminals of the drive circuits 23*a* and 23*b* are connected to a common junction J1 which is in turn connected to ground through a resistor R1 and also to the power source +Vcc, shown in the form of an input terminal 24, through a normally opened selector switch S1. Therefore, the drive circuits 23*a* and 23*b* are normally held in a disabled condition and do not drive the solid-state display gauges 4 and 5 even though output signals from the decoders 33*a* and 33*b* are respectively applied thereto, but can be brought into an enabled condition only when the selector switch S1 is closed by the vehicle operator. When in the enabled condition, the drive circuits 23*a* and 23*b* drive the display gauges 4 and 5 in accordance with the output signals from the respective decoders 33*a* and 33*b***.

The fuel sensor 13 is similarly connected to one input terminal of a drive circuit 25 through an analog-to-digital converter 17 and then through a decoder 34. The drive circuit 25 has another input terminal connected to an output terminal of an OR gate 26 for a reason which will be described later. Similarly, the temperature sensor 14 is connected to one input terminal of a drive circuit 28 through an analog-to-digital converter 18 and then through a decoder 35, said drive circuit 28 having another input terminal which is connected to an output terminal of an OR gate 29.

It is to be noted that each of the circuit components 15 to 18, **19*a*, 19*b*, 21*a*, 21*b*, 23*a*, 23*b*, 25, 28, 33*a*, 33*b*, 34 and 35 may be of any known construction and can readily be designed by those skilled in the art with no difficulty to suit the purpose intended in the present invention, and accordingly, the details thereof will not be herein described for the sake of brevity. This arrangement is equally application to the case where solid-state display gauges 1, 2, 4, 5, 7 and 9** are each constituted by a plurality of liquid crystal display cells instead of the electroluminescent elements.

Figure 2:
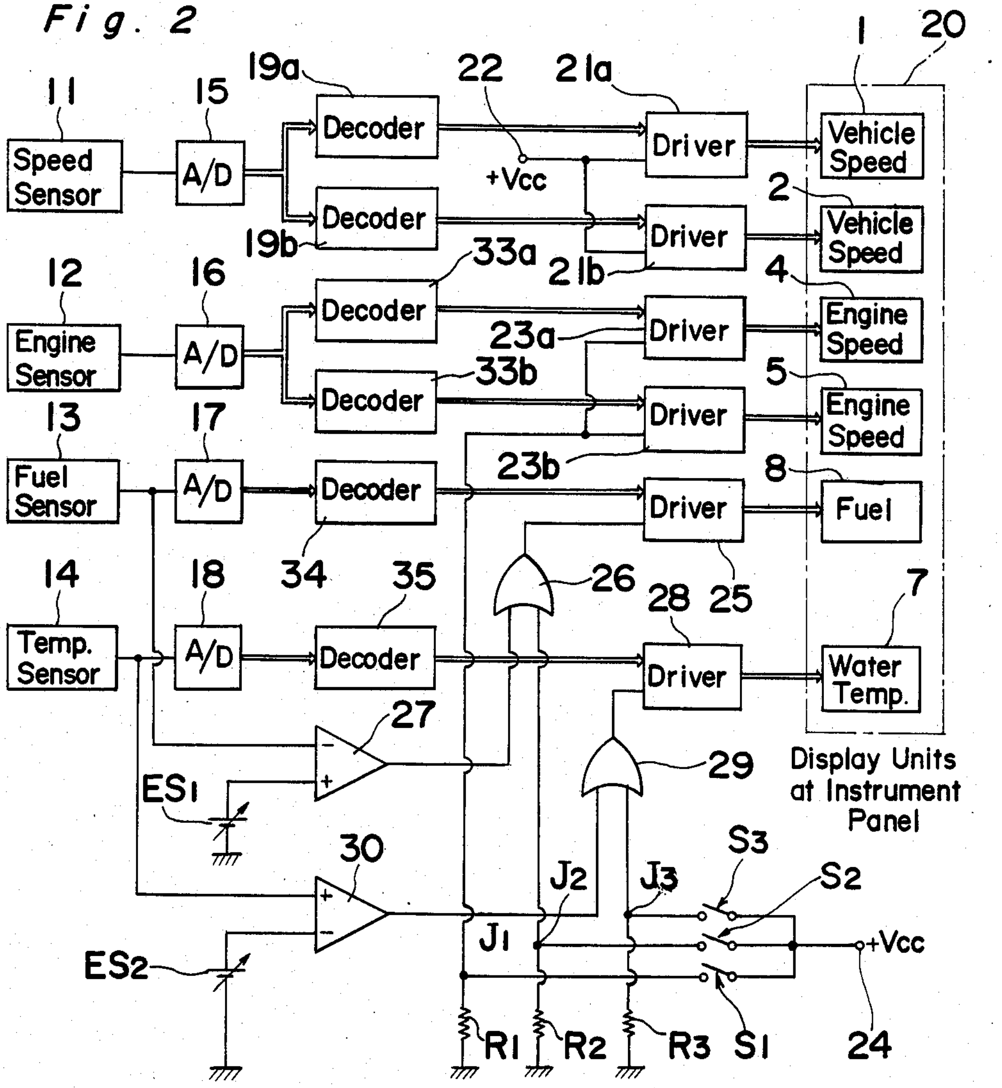
FIGS. 2 and 2A are circuit block diagrams of two versions of a solid-state information display apparatus according to the present invention.

Referring still to FIG. 2, it is desirable and/or necessary in terms of traffic safety to allow the fuel remaining and the coolant temperature to be automatically displayed or indicated independently of the vehicle operator's will and in the event that an out-of-limits condition occurs, i.e., that the level of fuel in the fuel tank approaches a zero level and the coolant temperature is too high for the engine to be operated. In view of this, one input terminal of the OR gate 26 is connected to a junction J2 which is in turn connected to ground through a resistor R2 and also to the power source terminal 24 through a normally opened selector switch S2 and, similarly, one input terminal of the OR gate 29 is connected to a junction J3 which is in turn connected to ground through a resistor R3 and also to the power source terminal 24 through a normally opened selector switch S3.

Another input terminal of the OR gate 26 is connected to an output terminal of a comparator 27 having one of its input terminals connected to the fuel sensor 13 and the other of its input terminals connected to ground through a reference voltage source ES1. Similarly, another input terminal of the OR gate 29 is connected to an output terminal of a comparator 30 having one of its input terminals connected to the temperature sensor 14 and the other of its input terminals connected to ground through a reference voltage source ES2. The voltage from the reference voltage source ES1 may correspond to the zero level, or a slightly higher level, of the fuel remaining in the fuel tank whereas the voltage from the reference voltage source ES2 corresponds to the maximum allowable temperature of the coolant for the engine.

In this circuit arrangement, it will readily be understood that, while the drive circuit 25 is normally in its disabled condition, it can be brought into an enabled condition either when the selector switch S2 is closed by the vehicle operator or when the level of the output signal from the fuel sensor 13 exceeds the reference voltage determined by the reference voltage source ES1. On the other hand, while the drive circuit 28 is normally in its disabled condition, it can be brought into an enabled condition either when the selector switch S3 is closed by the vehicle operator or when the level of the output signal from the temperature sensor 14 exceeds the reference voltage determined by the reference voltage source ES2.

From the foregoing description, it has now become clear that, since the drive circuits 21*a* and 21*b* for the solid-state display gauges 1 and 2 are always enabled during the use of the automobile vehicle, the running speed of the vehicle can be displayed at all times and that the display of the status of the engine speed, the fuel remaining and the coolant temperature being monitored can be effected through the individual solid-state display gauges 4, 5, 7 and 8 on a selective basis upon demand or automatically upon the occurrence of our out-of-limits condition. Accordingly, during the normal use of the vehicle, the display gauges except for the vehicle speed indicating gauge emit no light and, consequently, there is no possibility that the vehicle operator is dazzled by excessive light.

Moreover, without the vehicle operator required to manipulate one or both of the selector switches S2 and S3, one or both of the fuel remaining and the coolant temperature can automatically be displayed or indicated through their respective display gauges upon the occurrence of an out-of-limits condition.

Although the present invention has fully been described in connection with the preferred embodiment thereof with reference to the accompanying drawings, it is to be noted that various changes and modifications are apparent to those skilled in the art. By way of example, as discussed hereinabove, the liquid crystal display cells in combination with a common illuminator or separate illuminator may be employable instead of the electroluminscent elements.

Figure 2A:
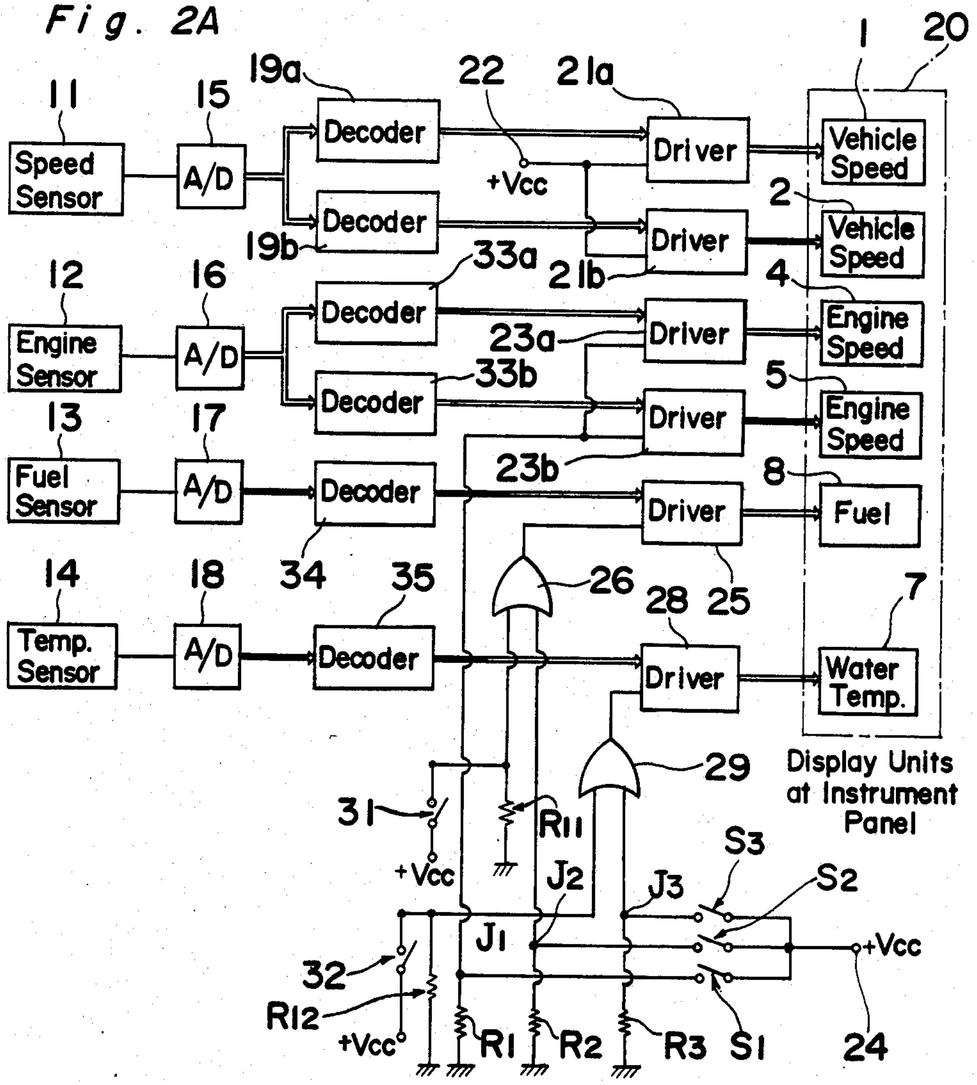

Furthermore, as shown in FIG. 2A, instead of the employment of the circuit including the comparator 27 and the reference voltage source ES1, a normally opened mechanical switch, for example, a float switch, of a type adapted to be closed in response to the reduction of the fuel level in the fuel tank below a predetermined value may be employed. In this case, the mechanical switch 31 may be connected in the manner as shown in combination with a resistor R11. Similarly, instead of the employment of the circuit including the comparator 30 and the reference voltage source ES2, a normally opened mechanical switch, for example, a thermostat switch, of a type adapted to be closed in response to the elevation of the coolant temperature above a predetermined value may be employed. In this case, the mechanical switch 32 may be connected in the manner as shown in combination with a resistor R12.

Accordingly, such changes and modifications are to be understood as included within the true scope of the present invention unless they depart therefrom.

We claim:

1. An information display apparatus for a vehicle for indicating the status of parameters which altogether represent the condition of the vehicle being operated, which apparatus comprises, in combination:

a first display unit including at least one first detecting means for detecting a change in a running speed of the vehicle and for generating an output signal indicative of such change in said vehicle running speed, a first indicator, and a first driving means electrically connected between said first indicator and said first detecting means for driving said first indicator, said first driving means causing said first indicator to present a visual indication of said change in said vehicle running speed;

a second display unit including at least one second detecting means for detecting a change in an amount of fuel remaining in a fuel tank of the vehicle or a temperature of coolant used to cool an engine of the vehicle and for generating an output signal indicative of such change in said remaining fuel amount or coolant temperature, a second indicator, a second driving means electrically connected between said second indicator and said second detecting means for driving said second indicator, and a manually operated switch means connected to said second driving means for causing said second driving means to cause said second indicator to present a visual indication of said change in said remaining fuel amount or coolant temperature;

a third display unit including at least one third detecting means for detecting a change in an engine speed of said vehicle engine and for generating an output signal indicative of such change in said engine speed, a third indicator, a third driving means electrically connected between said third indicator and said third detecting means for driving said third indicator, an additional manually operated switch means connected to said third driving means for causing said third driving means to cause said third indicator to present a visual indication of said change in said engine speed; and an emergency output generator means electrically connected to said second detecting means for generating an emergency output signal when said output signal from said second detecting means deviates from a predetermined value, said second driving means being enabled so as to generate said emergency output signal in response to said emergency output signal from said emergency output generating means regardless of the position of said manually operated switch;

wherein said emergency output generating means comprises a comparator means which is electrically connected to said second detecting means, and a gating circuit electrically connected between said comparator means and said second driving circuit, said gating circuit being enabled only when said output signal from said second detecting means deviates from said predetermined value, so as to allow the passage of said emergency output signal therethrough to said second driving means;

wherein said apparatus further comprises a power source, wherein said manually operated switch means and said additional manually operated switch means each comprise a switch having one terminal connected to said power source and having another terminal connected to a resistor connected to a ground, said another terminal of said switch of said manually operated switch means being connected to said second driving means and said another terminal of said switch of said additional manually operated switch means being connected to said third driving means;

and wherein said gating circuit comprises an OR gate having inputs connected to an output of said comparator means and said another terminal of said switch of said manually operated switch means and having an output connected to said second driving means.

2. An apparatus as claimed in claim 1 wherein each of said first and second display units is constituted by a plurality of electroluminescent elements arranged in a predetermined pattern.

3. An apparatus as claimed in claim 2, wherein said electroluminescent elements are light emitting diodes.

* * * * *